United States Patent
Ishikawa

Patent Number: 5,485,766
Date of Patent: Jan. 23, 1996

[54] TERTIARY NEGATIVE-DEVIATION FLEXING CONTACT TYPE GEAR DRIVE OF NON-PROFILE-SHIFTED TOOTH PROFILE

[75] Inventor: Shoichi Ishikawa, Kanagawa, Japan

[73] Assignee: Harmonic Drive Systems, Inc., Tokyo, Japan

[21] Appl. No.: 256,721

[22] PCT Filed: Nov. 24, 1992

[86] PCT No.: PCT/JP92/01535

§ 371 Date: Sep. 14, 1994

§ 102(e) Date: Sep. 14, 1994

[87] PCT Pub. No.: WO94/12808

PCT Pub. Date: Jun. 9, 1994

[51] Int. Cl.[6] ............................ F16H 1/32
[52] U.S. Cl. ............................ 74/640
[58] Field of Search ............................ 74/640

[56] References Cited

U.S. PATENT DOCUMENTS

| | | | |
|---|---|---|---|
| 2,906,143 | 9/1959 | Musser | 74/640 |
| 4,823,638 | 4/1989 | Ishikawa | 74/640 |
| 4,974,470 | 12/1990 | Ishikawa et al. | 74/640 |

FOREIGN PATENT DOCUMENTS

| | | |
|---|---|---|
| 45-41171 | 12/1970 | Japan . |
| 63-115943 | 5/1988 | Japan . |

*Primary Examiner*—Dirk Wright
*Attorney, Agent, or Firm*—Burns, Doane, Swecker & Mathis

[57] ABSTRACT

In a cup-shaped flexing contact gear (1), both a rigid internal gear (2) and a flexible external gear (3) are made to be non-profile-shifted spur gears, an opening (3a) of the flexible external gear (3) is set in a state of negative deviation wherein a deflection of the opening is lower in value than a normal deflection; a moving locus is obtained through rack approximation of teeth of the external gear to the internal gear at respective sections of rotation of tooth trace of the flexible external gear (3), an envelope (e) is obtained by overlapping the moving locus on one of sections of rotation, another moving locus is obtained in a section of rotation at the end portion of tooth trace on the side of a diaphragm or in the vicinity of the outside of the end portion and is smoothly connected to the envelope to thereby obtain a composite curve (L). A curve (FE) is obtained by similarity transforming at a reduction ratio of ½ a portion from a starting point (A) of the envelope (e) to a terminating point (E) thereof corresponding to two times the working depth in the direction of the depth from an apex of a moving locus (l o) when deviation is 0, using the terminating point as an original point, and this curve is made to be each of main portions of convex tooth profiles at tooth faces of the both gears (2, 3). Further, a composite curve (MFE) including a straight line (MF) having a limited pressure angle ($\alpha_M$) associated with a deflection value of the opening inserted in the vicinity of a datum point (M) of tooth profile and a transient curve smoothly connecting the straight line to the main portion of the convex tooth profile is made to be each of tooth profiles at the tooth faces of the both gears.

3 Claims, 6 Drawing Sheets

2 RIGID INTERNAL GEAR
3 FLEXIBLE EXTERNAL GEAR
4 WAVE GENERATOR

TERTIARY NEGATIVE-DEVIATION FLEXING CONTACT TYPE GEAR DRIVE OF NON-PROFILE-SHIFTED TOOTH PROFILE

DESCRIPTION

1. Technical Field

The present invention relates to a flexing-contact-type gear drive, and particularly to tooth profiles of a rigid internal gear and a flexible external gear employed in this type of gear drive.

2. Background Art

A flexing-contact-type gear drive typically consists of a rigid circular internal gear, a flexible external gear which has 2n (n being a positive integer) less teeth than the internal gear and which is disposed inside the internal gear and flexed into an elliptical shape so as to mesh with the internal gear at two places, and wave generator fitted inside the external gear for flexing it. The basic tooth profile for the gears of a flexing contact gear drive is linear (see U.S. Pat. No. 2,906,143). On the other hand, an involute tooth profile has also been proposed (see Japanese Patent Publication No. SHO 45-41171). However, where the linear or the involute tooth profile is adopted as that of each of the internal and external gears, the addendum faces of the gears cannot be continuously meshed with each other.

For increasing load capacity the inventor of the present invention proposed in Japanese Patent Laid Open No. SHO 63-115943 a system using as the basis for the tooth face profile the curve obtained by similarity transforming the locus of motion at a reduction ratio of ½ over a prescribe range from the meshing limit point on the locus of motion based on the rack approximation of the tooth of the external gear relative to the internal gear determined by the shape of the wave generator. With the tooth profile disclosed in this publication, the addendum faces of the internal and external gears can be continuously meshed with each other.

In the meantime, as a flexing-contact-type gear drive, one having a cup-shaped flexible external gear has been known. If the internal and external gears of this type gear drive are designed to have the same tooth profiles as disclosed in the above Japanese Patent Laid Open No. SHO 63-115943, it cannot be realized to form a continuous meshing between the teeth of the gears all along the tooth trace direction.

More specifically, in a cup-shaped, flexing-contact-type gear drive, the cup-shaped flexible external gear is subjected to deflection called coning, in which the deflection value of the external gear increases gradually in the direction from its diaphragm side to its opening side and in proportional to a distance from the diaphragm (the deflection being a difference in the length between the major axis and the minor axis of the elliptical shape of the external gear). The change in the deflection along the axis of the external gear due to the coning is not considered in determination of the tooth profiles disclosed in Japanese Patent Laid Open No. SHO 63-115943.

Accordingly, where a cup-shaped, flexing-contact-type gear drive is provided with the internal and external gears of the tooth profiles as disclosed in the above publication, both gears can be meshed continuously with each other only at a specific sectional portion along the tooth trace direction (for example, at such a sectional portion of non-deviation where a normal deflection occurs), while they may be improperly meshed to cause tooth interference or the like at the other sectional portions.

Measures to avoid the defect are disclosed, for example, in Japanese Patent Laid Open Nos. SHO 62-75153 and HEI 2-62461. In these measures, however, it is required to apply special additional processings such as crowning, relieving and the like to the teeth of gears.

In order to achieve a wider range of meshing of the external and internal gears along the tooth trace direction of the cup-shaped flexible external gear without tooth interference between the external and internal gears, the inventor of the present invention proposes a tooth profile disclosed in Japanese Patent Application No. HEI-3-357036.

The invention disclosed in this patent application was made based on the recognition that, in a flexing contact type gear drive, moving loci of teeth of the cup-shaped flexible external gear at respective sections of rotation along tooth trace direction thereof are found to be changed and decreased in deflection along the tooth trace direction viewed from the opening side of the flexible external gear, and that these moving loci are found to form a single envelope when these moving loci are overlapped on a same plane. In this patent application, a rack approximation method is introduced to simplify the analysis in finding a formula of the obtained envelope. Moreover, a moving locus of the flexible external gear is obtained at a section of rotation near and outside the diaphragm-side end of the flexible external gear, and is connected to the envelope to thereby form a composite curve. Then, a portion of the composite curve which starts from a selected meshing limit point and corresponds to two times the working depth in the tooth depth direction is subjected to the similarity transformation at a reduction ratio of ½ to obtain a curve which is employed as convex tooth profiles of tooth faces of the external and internal gears.

The present inventor also proposed in Japanese Patent Application No. HEI 3-357037 that a moving locus based on which tooth profiles are introduced is defined only by the above-mentioned envelope. The invention disclosed in this Japanese Patent Application was made based on the recognition that the envelope is similar to a curve obtained by subjecting to the similarity transformation at a reduction ratio of ½ a moving locus of teeth of the flexible external gear at a rotational section of a non-deviated state. With this envelope, tooth profiles are determined which are applicable to tooth profiles of both gears of a cup-shaped, flexing-contact-type gear drive wherein the difference in tooth number between the rigid internal gear and the flexible external gear is four.

However, in the inventions disclosed in Japanese Patent Application Nos. HEI 3-357036 and HEI 3-357037, an opening of the cup-shaped flexible external gear is regarded as in a non-deviated state. Further, setting of a pressure angle at a datum point of tooth profiles is not specified.

While, recently there has been increased more and more a demand for enhanced performance of flexing contact type gear drives. In order to satisfy the demand, it is necessary to further enhance strength and rigidity of the flexing contact type gear drive, and at the same time it is necessary to further improve wear-resisting capability. For these purposes, the actual load distribution appeared on the teeth along the tooth trace direction must be equalized.

DISCLOSURE OF THE INVENTION

The present invention is directed to an improvement of tooth profiles disclosed in Japanese Patent Application Nos. HEI 3-357036 and HEI 3-357037. The present invention is characterized by setting the deflection of an opening of a cup-shaped flexible external gear of a flexing contact type gear drive to be a negative-deviated state wherein the amount of deflection is set smaller than that of a normal deflection. Concept of positive and negative with respect to deviation of teeth are described in Japanese Publication No. SHO 45- 41171 by the same inventor of the present invention.

Further, according to the present invention, tooth profiles are determined based on a composite curve formed by an envelope of moving loci of teeth of a flexible external gear and a moving locus of teeth at a section of rotation which is located on an end of the diaphragm-side of the external gear along the tooth trace direction or located adjacent to the outside of the end portion thereof. This concept is similar to that disclosed in Japanese Patent Application Nos. HEI 3-357036 and HEI 3-357037, except that the moving locus of teeth at the section of rotation located on the end of the external gear is employed.

According to the present invention, different from the inventions disclosed in the above-cited Japanese Patent Application Nos. HEI 3-357036 and HEI 3-357037 in which the envelope employed includes the moving locus on the section of non-deviated state, a clearly limited portion of the envelope is employed which corresponds to an amount of negative deviation of teeth of each of respect sections of rotation of the flexible external gear along its tooth trace direction. In addition, the present invention is characterized in that an pressure angle at a datum point of tooth is defined in accordance with an amount of negative deviation occurred on an opening of a flexible external gear.

More specifically, according to the present invention, in a flexing contact type gear drive having a rigid internal gear, a cup-shaped flexible external gear disposed inside the internal gear, and a wave generator for deflecting the external gear into an elliptical shape such that the value of deflection is proportional to a distance from a diaphragm along the direction from the diaphragm to an opening of the external gear and for rotating the elliptical shape of the external gear, whereby a relative rotation between the both gears is generated by rotating the wave gear, tooth profiles of the rigid internal gear and the flexible external gear are defined as follows.

Firstly, both the rigid internal gear and the flexible external gear are made to be non-profile-shifted spur gears, and an opening of the flexible external gear is set to be a negative-deviated state in which a deflection occurred is lower in volume than a normal deflection. Then, a moving locus is obtained through rack approximation of teeth of the external gear to the internal gear at respective sections of rotation along the tooth trace direction of the flexible external gear, and the obtained moving locus is overlapped on one of sections of rotation, whereby an envelope is obtained. Another moving locus in a section of rotation at an end portion of tooth trace on the side of a diaphragm or in the vicinity of the outside of the end portion is smoothly connected to the envelope so that a composite curve is obtained. A curve is obtained by subjecting to the similarity transformation at a reduction ratio of ½ a portion from a starting point of the envelope to a terminating point corresponding to two times the working depth in the direction of depth from an apex of a moving locus when the deviation is 0, using the terminating point as an original point. The curve thus obtained is made to be each of main portions of convex tooth profiles at the tooth faces of the both gears. Furthermore, a composite curve is obtained which includes a straight line having a limited pressure angle associated with a deflection value of an opening and inserted in the vicinity of a datum point of tooth profile, and a transient curve smoothly connecting the above straight line to the main portion of the convex tooth profile. This composite curve or its similar curves is made to be each of tooth profiles at the tooth faces of the both gears. While, tooth flanks of the both gears are defined by a composite tooth profile including a straight line and a concave curve which is symmetrical to the tooth profile of each of the tooth faces of the gears with respect to each of the datum points of tooth profiles of the gears, or are defined by a tooth profile which is obtained by providing the composite tooth profile with some amount of escape.

BRIEF DESCRIPTION OF DRAWINGS

FIGS. 6, 7 and 8 show a locus of one of teeth of the flexible external gear when moving with respect to a tooth groove of a rigid internal gear, wherein FIG. 6 shows a moving locus thereof at a section of rotation on an opening of the flexible external gear, FIG. 7 shows a moving locus thereof at a central section of rotation of tooth trace of the external gear, and FIG. 8 shows a moving locus thereof at a section of rotation on an end portion of the diaphragm of the external gear.

FIGS. 11, 12 and 13 show meshing conditions of the tooth profiles of the present invention, respectively, wherein FIG. 11 shows a state of meshing at a section of rotation on the opening of the external gear, FIG. 12 shows a state thereof at a central section of rotation of tooth trace of the external gear, and FIG. 13 shows a state thereof at a section of rotation on an end of the diaphragm of tooth trace of the external gear.

BEST MODE FOR CARRYING OUT THE INVENTION

An example of the present invention will now be described with reference to the drawings.

Figure 1:
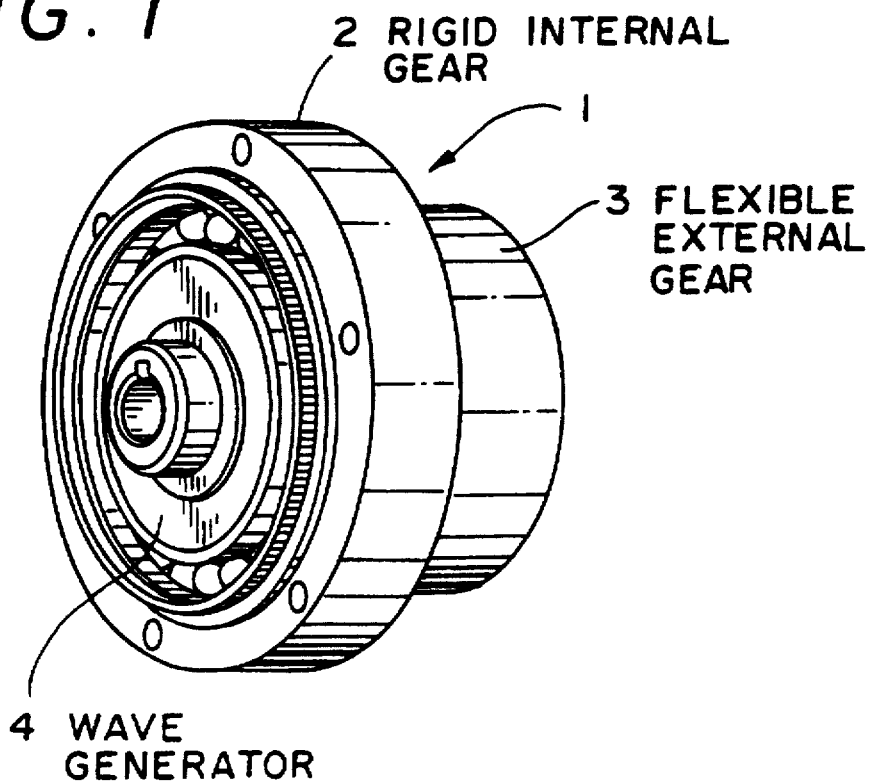
FIG. 1 is a perspective view of a cup-shaped flexing contact type gear drive.
Figure 2:
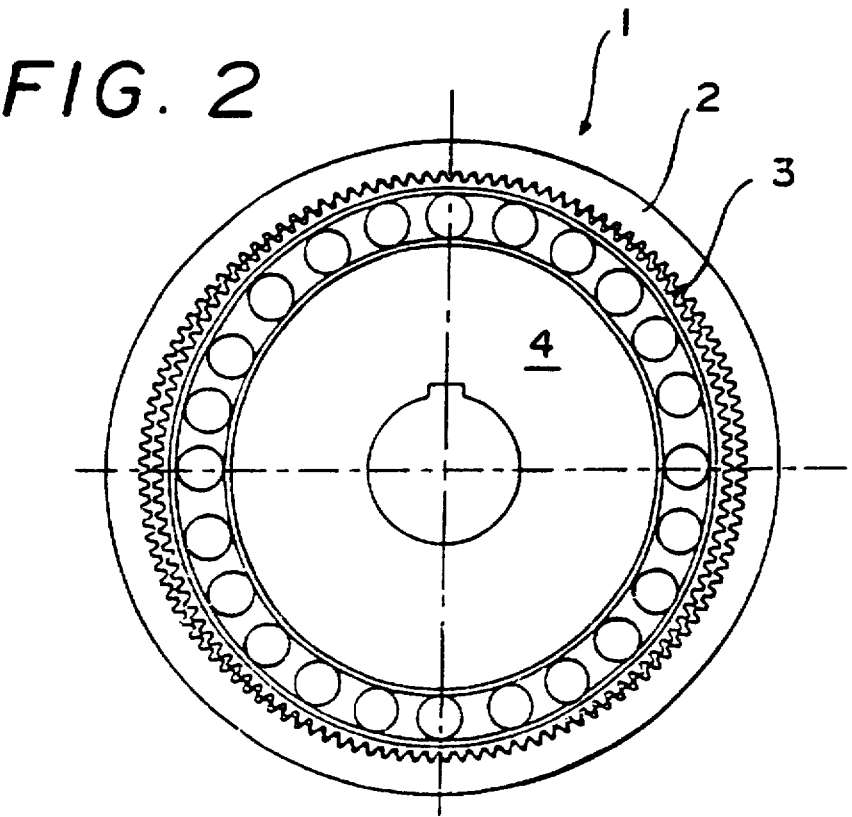
FIG. 2 is a front view of the gear drive of FIG. 1.

FIGS. 1 and 2 is a perspective view and a front view of a known cup-shaped flexing contact type gear drive. The flexing contact type gear drive 1 comprises a circular rigid internal gear 2, a cup-shaped flexible external gear 3 disposed inside the internal gear, and an elliptically-shaped wave generator a fitted into the external gear. The cup-shaped flexible external gear 3 is in a state flexed into an elliptical shape by the elliptically-shaped wave generator 4.

Figure 3:
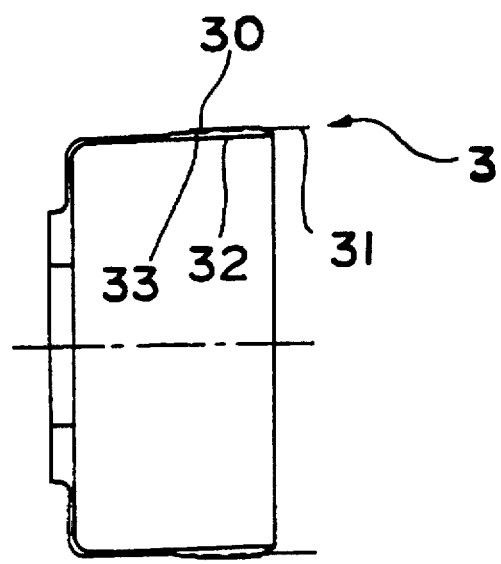
FIG. 3 illustrates a state of a flexible external gear before deflection due to coning.
Figure 4:
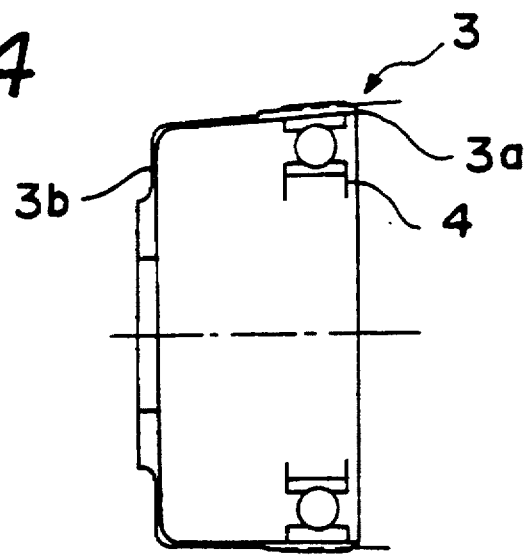
FIG. 4 illustrates a state of the flexible external gear on a major axis of elliptical shape after deflection due to coning.
Figure 5:
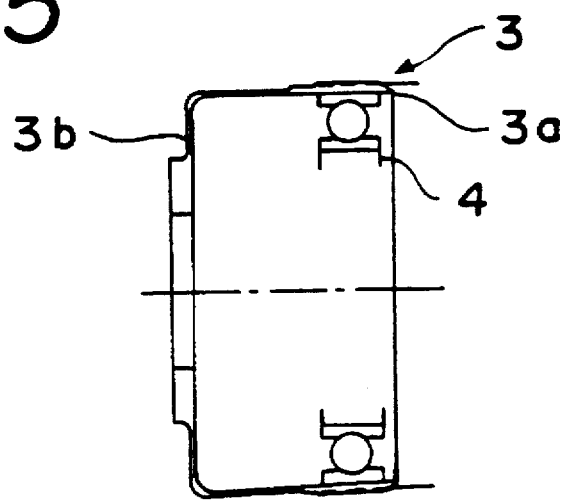
FIG. 5 illustrates a state of the flexible external gear on a minor axis of elliptical shape after deflection due to coning.

FIGS. 3, 4 and 5 show a state of deflection of the flexible external gear caused by coning, respectively, by means of a section taken along an axis of the flexible external gear. FIG. 3 shows a state of deflection of the external gear before flexed by the wave generator 4 (before deflection). FIG. 4 is a sectional view taken along the axis of the external gear and along a major axis of the wave generator, showing a state flexed by the wave generator 4. Whereas, FIG. 6 is a sectional view taken along the axis of the external gear and along a minor axis of the wave generator, showing a state flexed by the wave generator 2.

As can be seen from these figures, the cup-shaped flexible external gear 3 is deflected owing to coning, so that the deflection in value is maximum on its opening 3a, and is gradually decreased toward the side of its diaphragm 3b.

Figure 6:
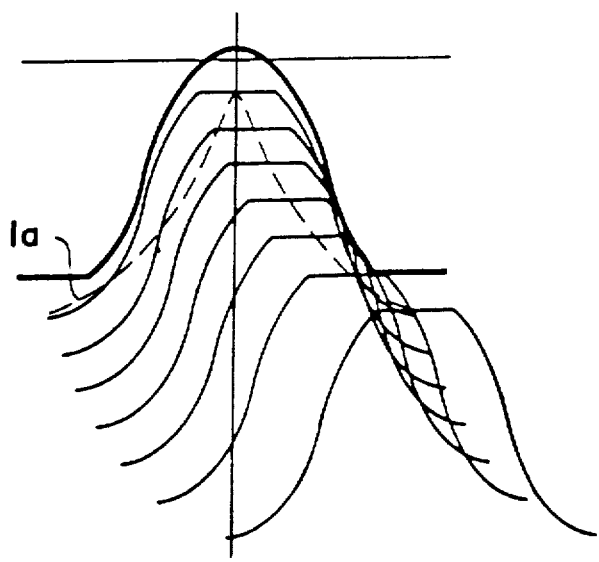
Figure 7:
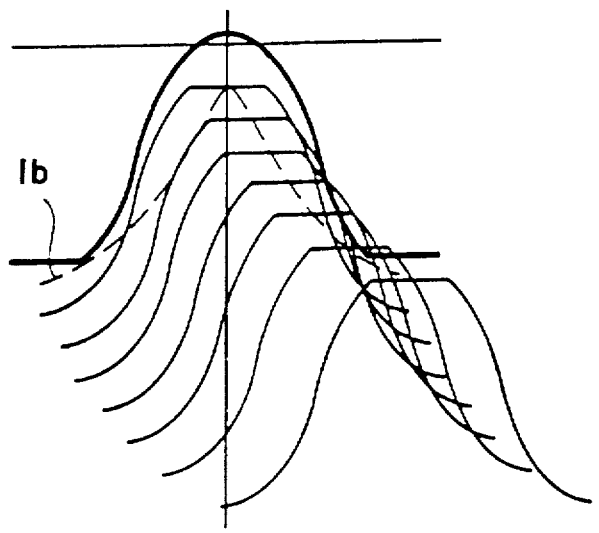
Figure 8:
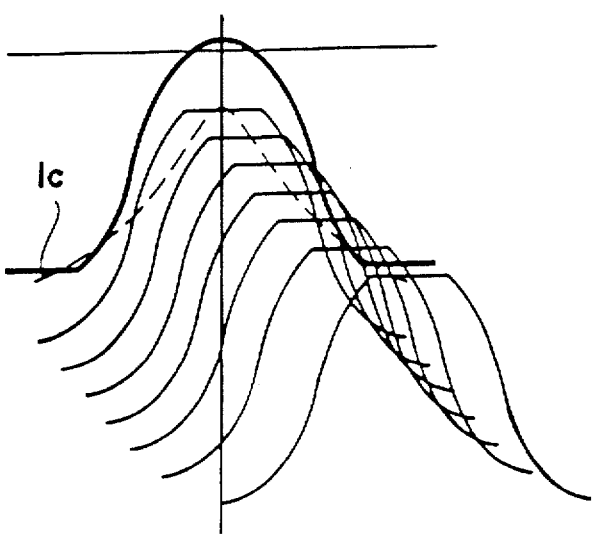

FIGS. 6, 7 and 8 show a moving locus 1 of one of teeth of the cup-shaped flexible external gear with respect to a tooth groove of the rigid internal gear 2 of the flexing contact type gear drive 1, the moving locus being obtained by the rack approximation provided that the numbers of the both gears 2 and 3 become infinite without changing the difference in number of teeth between the both gears. Each of the obtained moving loci is in a state of negative deviation. Note that in these-figures, the teeth of the internal and external gears are provided with same tooth profiles provisionally.

In these figures, the moving locus of FIG. 6 is obtained at a section of rotation of a point 31 on the opening 3a of the teeth 30 of the cup-shaped flexible external gear 3. The moving locus of FIG. 7 is obtained on a section of rotation at a center of tooth trace of the external gear, while that of FIG. 8 is obtained at a section of rotation of a point 33 on an end portion of the diaphragm 3b of tooth trace of the external gear.

As is apparent from these figures, a degree of tooth interference of the both gears increases gradually toward the side of the diaphragm 3b from the opening 3a. To avoid the tooth interference, it is necessary to apply an additional processing such as relieving to the teeth of the gears.

The moving locus on a desired section of rotation can be expressed by $$x = 0.5\ mn(\eta = \kappa \sin \eta)ps$$

$$y = mn\ (1-\kappa \cos \eta) \qquad (1)$$

wherein x is an orthogonal coordinate along a pitch line of a rack, y is an orthogonal coordinate along a depth of the rack, m is a module of the tooth, n is ½ of the number of tooth difference between the rigid internal gear and the flexible external gear, $\eta$ is an angular parameter, $\kappa$ is a deflection coefficient ($\kappa=1$ represents a state of non deviation, whereas $\kappa<1$ represents that of negative deviation).

The following expression (2) can be derived by eliminating the term, $\eta$ from the expression (1).

$$x - 0.5\ mn[\cos^{-1}\{(1-y/m/n)/\kappa\} - \kappa\sqrt{1-\{(1-y/m/n)/\kappa\}^2}] = 0 \qquad (2)$$

Further, the following expression (3) can be obtained by solving $\kappa$ through a partial differential of the expression (1) in terms of $\kappa$.

$$\kappa = \sqrt{1 - y/m/n} \qquad (3)$$

Elimination of the term $\kappa$ from the expressions (2) and (3) makes an expression defining an envelope e obtained by overlapping a moving locus with respect to each value of $\kappa$ on an plane. That is, the following expression (4) can be obtained.

$$x - 0.5\ mn\ \{\cos^{-1}\sqrt{1-y/m/n} - \sqrt{y/m/n(1-y/m/n)}\} = 0 \qquad (4)$$

The definition of the above envelope leads to the following facts. If the constant $\kappa$ is set to be a certain value, this means to select a section of rotation having a deflection in value corresponding to the value of $\kappa$. On this section of rotation, the envelope is meant to contact with the moving locus of teeth at the point of y obtained by substituting the above value in the equation (3) for the coefficient $\kappa$. In other words, a portion of the envelope on or adjacent to this point of y represents a part of the moving locus of teeth.

As mentioned before, the inventor of the present invention found that the above envelope is not but a similar curve obtained by reducing a moving locus at a ratio of ½, the moving locus being obtained when $\kappa=1$ (non deviation) in the equation (2). However, it is insufficient to provide an effective tooth depth by using only this envelope. This is especially apparent when n=1, that is, when the number of tooth difference between the rigid internal gear and the flexible external gear is 2.

Therefore, according to the present invention, based on the inventions disclosed in the above-cited Japanese Patent Application No. HEI 3-357036, a moving locus of teeth of the flexible external gear is obtained on a section of rotation of an end portion of the diaphragm side of tooth trace or on a section of rotation in the vicinity of outside of the end portion (wherein the section of rotation is referred to hereinafter as the limit section), and is smoothly connected to the envelope to form a composite curve, so that the composite curve is made to a basis of deriving tooth profiles of the gears.

Figure 9:
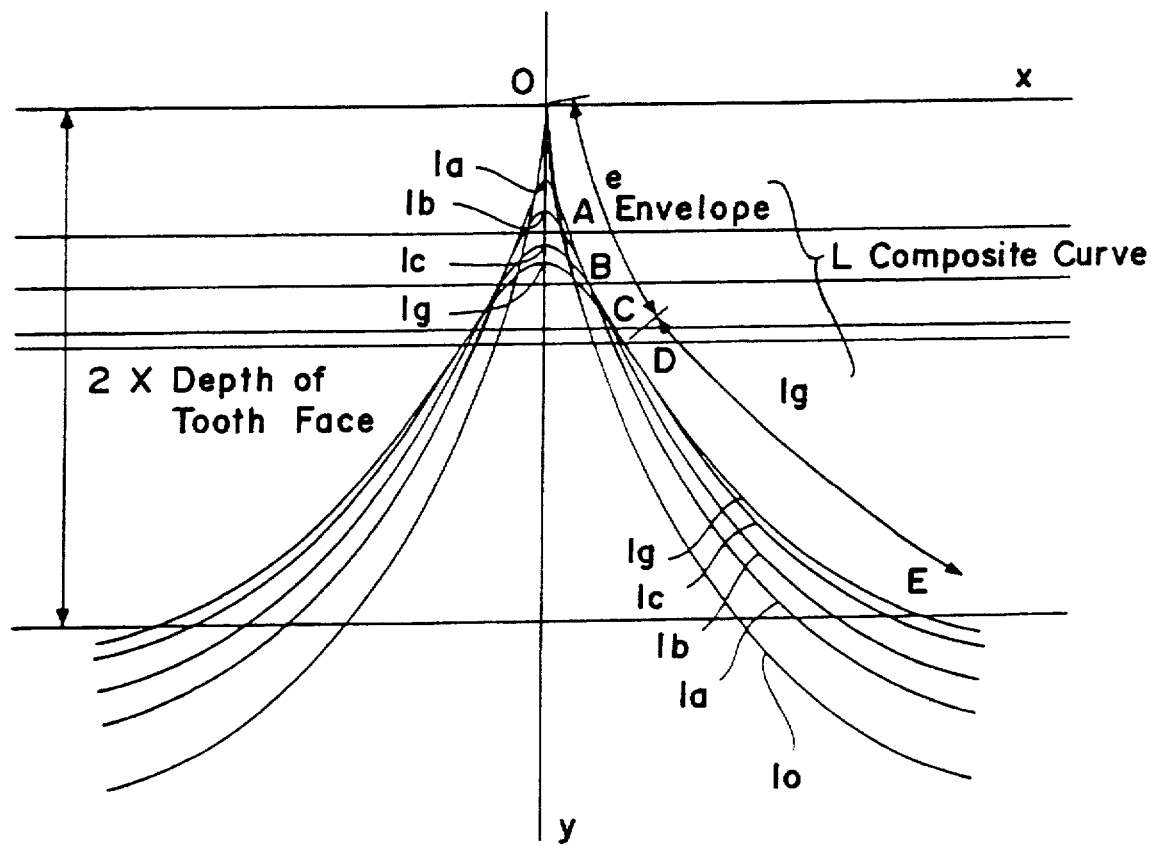
FIG. 9 is a composite curve by which a tooth profile of the present invention is defined.

FIG. 9 illustrates the thus formed composite curve L. In this figure, there are illustrated five moving loci in total including a moving locus 1 a of teeth on a section corresponding to the state of non deviation and a moving locus 1 g of teeth on the section of rotation in the vicinity of outside of the end portion of tooth trace of the diaphragm (the above-mentioned limit section), in addition to the respective moving loci 1 a, 1 b and 1 c shown in FIGS. 6, 7 and 8. Further, the respective points A, B, C and D of FIG. 9 represent the places where the moving loci 1 a, 1 b and 1 c are contacted with the envelope e, respectively. Where the limit section is selected on the end portion of tooth trace of the diaphragm, the moving locus 1 g is in accordance with the moving locus 1 c.

Figure 10:
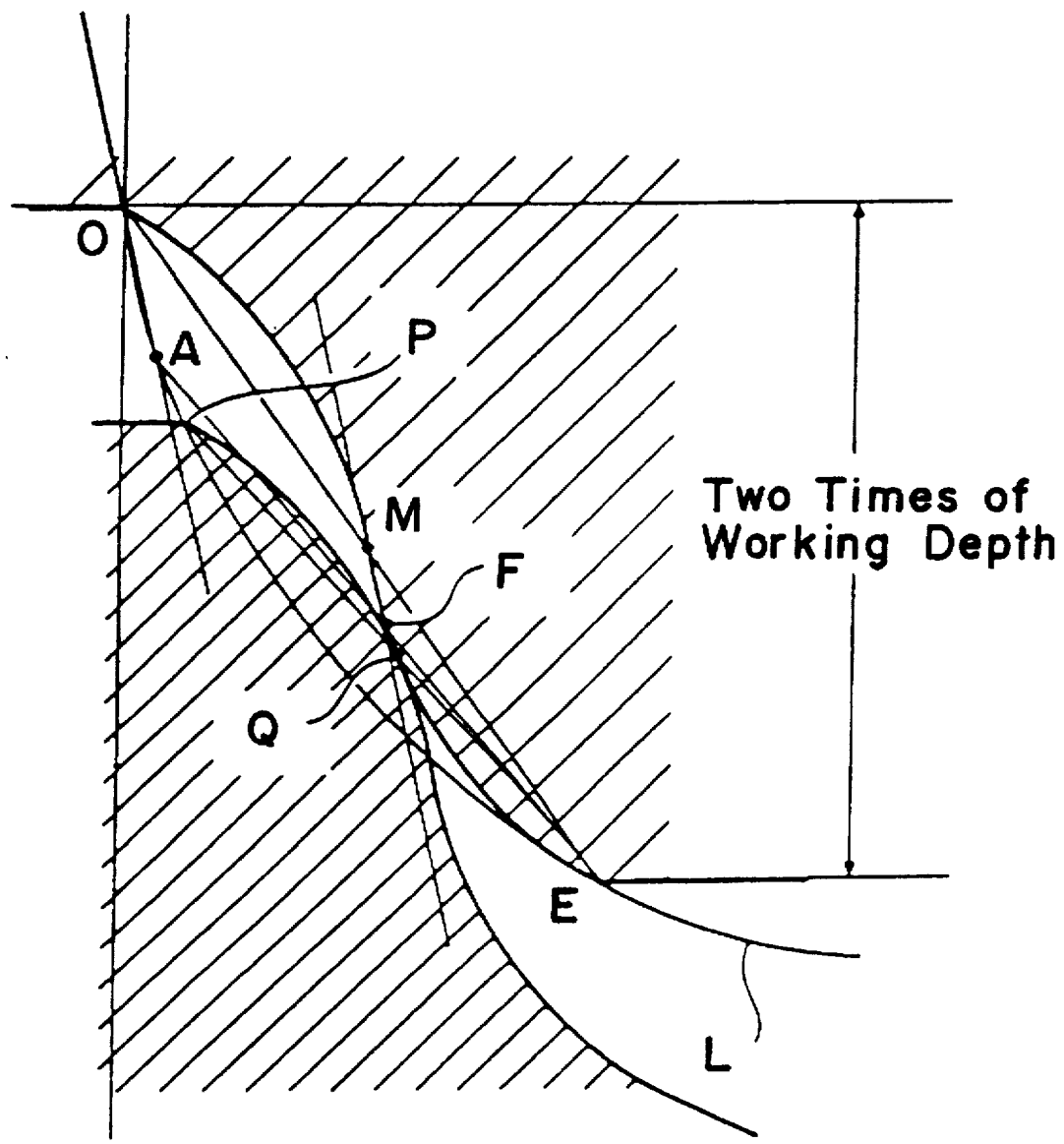
FIG. 10 illustrates how to obtain the tooth profile of the present invention from the composite curve of FIG. 9.

FIG. 10 shows how to derive the tooth profiles of the present invention from the composite curve L. Now, a prescribed portion of this curve is selected from a point A to a point E. The starting point A is a point where the moving locus 1 a of teeth on the section of rotation of the opening 3a of the flexible external gear 3 is contacted with the envelope e. The terminating point E is a point where the value in y-ordinate is equal to the two times of working tooth depth, this pint being usually located on the moving locus 1 g of teeth on the limit section as mentioned above.

While, it was not specified in the inventions disclosed in Japanese Patent Application Nos. HEI 3-357036 and HEI 3-350737 how to settle the point A.

In contrast to this, according to the present invention, the point A can be settled as follows. Where the deflection constant of the opening 3a of the flexible external gear is $\kappa_a$, the value of $\kappa_a<1$, and therefore in accordance with the expression (3), $$y = mn(1 - \kappa_a^2) \qquad (5)$$

can be obtained. By applying this equation into the equation (2), the x and y coordinates of the point A can be settled. Further, for the purpose of later necessity, a value of $\eta_a$ corresponding to the point A is obtained at this point from the equations (1) and (5).

$$\eta_a = \cos^{-1} \kappa_a \qquad (6)$$

Now, a straight line is drawn passing through the origin of the coordinate axes and the point A. Then, a composite curve MFE is obtained by similarity transforming a composite curve OAE at a reduction ratio of ½. The thus obtained composite curve MFE is rounded at the point F so as to smoothly connect the curve and the straight portions thereof, which in turn is made to be convex tooth profiles at the tooth faces of the rigid internal gear 2. Thereafter, a curve MO which is symmetrical to the convex tooth profile with respect to the point M (datum point) is obtained and is made to be convex tooth profiles at the tooth faces of the flexible external gear 3. Accordingly, the tooth profiles of the present invention become linear tooth profiles on and near the datum points through the rack approximation. Then, the pressure angle $\alpha_M$ is obtained of the straight line. The value of $\alpha_M$ can be obtained by the following equation, using the expressions (1) and (6).

$$\alpha_M = \tan^{-1}\{0.5(\eta_a - \kappa_a \sin \eta_a)/(1 - \kappa_a^2)\}$$

The tooth profiles at the tooth faces of the gears are assured to contact with each other properly at sections corresponding to the values of κ associated with the values of y through which the teeth of the external gear move in the tooth grooves of the internal gear. This is based on the facts that the tooth apex P of the flexible external gear is on the point obtained by extending two times the straight line EQ beyond the point Q from the point E, and the inclinations of the tangents at the point Q of the both tooth profiles are equal, which facts are derived from the fact that the tooth profiles of the both gears contacting with each other, for example, at the point Q in the drawing are symmetrical with respect to the point Q when viewed through the rack approximation, and by the process of defining the tooth profiles at the tooth faces as mentioned above.

Figure 11:
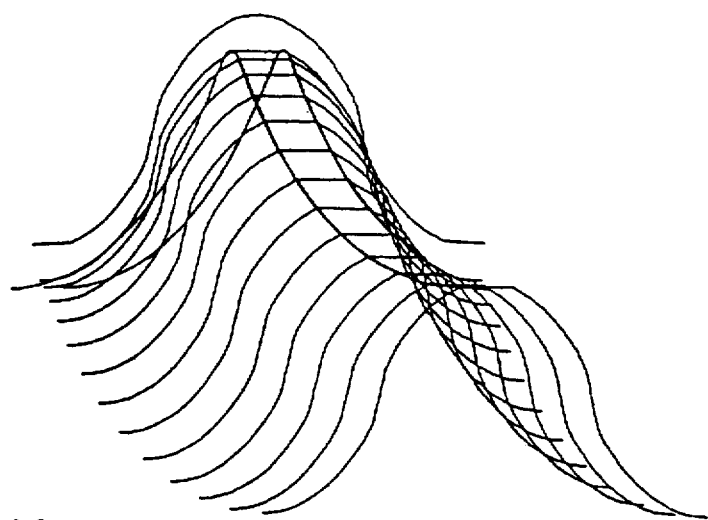
Figure 12:
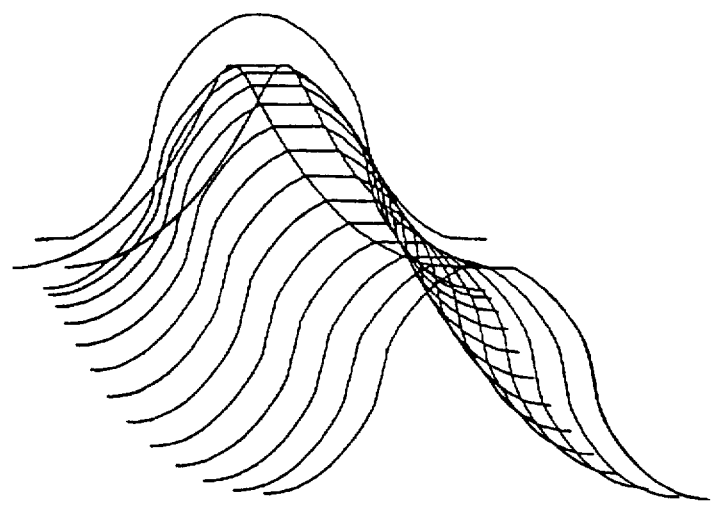
Figure 13:
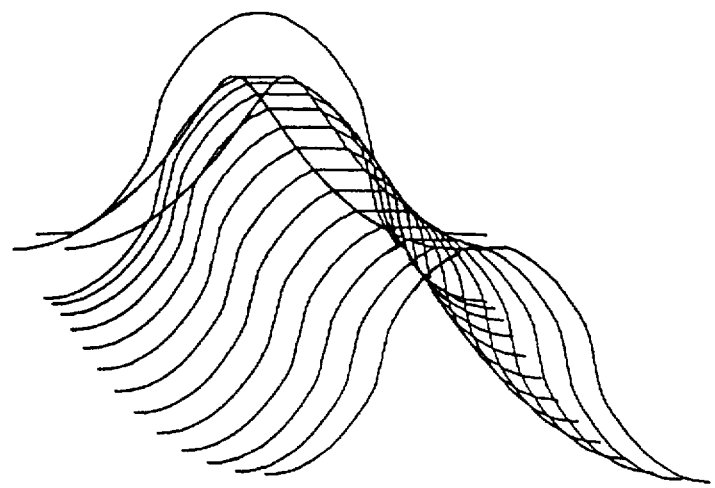

FIGS. 11, 12 and 13 show the meshing of the tooth profiles of teeth when the limit section is selected on the end portion of tooth trace of the diaphragm. FIG. 11 shows the meshing thereof on the section of rotation at the opening, FIG. 12 shows the meshing on the central section of rotation of tooth trace, and FIG. 13 shows that on the section of the end of tooth trace of the diaphragm. When viewed along the tooth trace direction, the portion of the composite curve defined by the envelope from the apex thereof corresponds to the meshing or contact of the teeth form the opening of the flexible external gear to the end portion of the diaphragm side or to the limit section in the vicinity of outside of the end portion, while the remaining portion of the composite curve corresponds to a continuous contact of the tooth profiles within the limit section. However, if the limit section is settled in the vicinity of outside of the end portion of the diaphragm side, no actual teeth exist on this section and therefore the meshing or contact of the teeth within this limit section is a imaginary one. Although, the meshing of the tooth portions located on the end portion of the diaphragm side can be regarded as like as that on the limit section. As seen from the drawings, according to the example of the present invention, in the sections shown in FIGS. 11 and 12, a part of the continuous contact of the teeth can be realized in accordance with a degree of contact between the envelope and the moving locus of the shown section, and in FIG. 13, a continuous contact of the toot profiles within the section can be realized.

INDUSTRIAL APPLICABILITY

According to the present invention, a composite curve is obtained by an envelope of a moving locus of the teeth of the flexible external gear obtained when the deflection of the opening of the flexible external gear is set to be a state of negative deviation which is lower in value than a normal deflection, and a moving locus at a section of rotation at an end portion of tooth trace on the side of a diaphragm or in the vicinity of the outside of the end portion, and the thus obtained composite curve is employed for defining the tooth profiles of the both gears. Hence, it is possible to use a limited part of the envelope for the basis of the formation of the tooth profiles of teeth, the limited part of the envelope corresponding to the values of negative deviation of the respective sections of rotation of tooth trace of the flexible external gear. Furthermore, the pressure angle at the datum point can be decided in connection with the value of the negative deviation of the opening of the flexible external gear.

By employing the tooth profiles of the present invention, in the cup-shaped flexing contact type gear drive, a smooth meshing of the teeth can be realized all along the tooth trace direction toward the end portion of the diaphragm side without need of additional processing such as crowning, relieving and the like applied on the external gear and with maintaining the thickness of tooth rim, whereby a natural or proper tooth contact can be realized along the tooth trace direction. In addition, if the limit section is selected on the end portion of tooth trace of the diaphragm side, the continuous meshing of tooth profiles within the section can also be utilized. This produces an effect of reducing stress of tooth surface, and at the same time produces an effect of enhancing a rigidity of teeth. Especially where n=2, in other words, the number of tooth difference between the rigid internal gear and the flexible external gear is 4, a radius of curvature of the tooth profile becomes larger in accordance with the increase of the tooth depth, and therefore a remarkable effect of reducing the stress of tooth surface can be obtained.

Moreover, since the flexing contact type gear drive is driven in a state of negative deviation, the tooth rim bending stress caused by elliptical deformation of the external gear can be greatly reduced. For instance, the bending stress occurred when $\kappa_a=1$ (non deviation) can be reduced by 20% by setting $\kappa_a=0.8$ (negative deviation).

With the reasons mentioned above, according to the present invention, a tertiary flexing contact gear drive of the type having high strength, rigidity and precision can be realized. Further, the present invention can be applied irrespective of the value of the coning angle, and therefore it can be applied directly to a cup-shaped flexible external gear of the short barrel type.

I claim:

1. A tertiary negative-deviated flexing contact type gear drive having a rigid internal gear, a cup-shaped flexible external gear disposed inside the internal gear, and a wave generator for flexing the external gear into an elliptical shape so that a deflection occurring in the external gear along a direction from a diaphragm to an opening thereof is proportional in value to a distance measured from the diaphragm, a relative rotation of the rigid internal gear and the flexible external gear being generated by a rotation of the wave generator; wherein both the rigid internal gear and the flexible external gear are made to be non-profile-shifted spur gears;

wherein the opening of the flexible external gear is set in a state of negative deviation wherein a deflection of the opening is lower in value than a normal deflection; a moving locus is obtained through a rack approximation of teeth of the external gear to the internal gear at respective sections of rotation of a tooth trace of the flexible external gear; an envelope is obtained by overlapping the moving locus on one of the sections of rotation; another moving locus is obtained in a section of rotation at an end portion of the tooth trace on a side of the diaphragm or in the vicinity of an outside of the end portion and is smoothly connected to the envelope to thereby obtain a composite curve; a curve is obtained by similarity transforming at a reduction ratio of ½ a portion from a starting point of the envelope to a terminating point thereof corresponding to two times a working depth in a direction of a depth from an apex of a moving locus when deviation is zero, using the terminating point as an original point; and the curve is made to be a main portion of a convex tooth profile for tooth faces of the rigid internal gear and the flexible external gear; and wherein a second composite curve including a straight line having a limited pressure angle associated with a deflection value of the opening inserted in the vicinity of a datum point of a tooth profile and a transient curve smoothly connecting the straight line to the main portion of the convex tooth profile is made to be the tooth profile for the tooth faces of the rigid internal gear and the flexible external gear.

2. The tertiary negative flexing contact type gear drive of claim 1, wherein tooth flanks of the rigid internal gear and the flexible external gear are defined by a composite tooth profile including a straight line and a concave curve which is symmetrical to the tooth profile of the tooth faces of the gears with respect to the datum point of the tooth profile of the gears.

3. The tertiary negative deviated flexing contact-type gear drive of claim 2, wherein the tooth flanks of the rigid internal gear and the flexible external gear are defined by a tooth profile which is obtained by providing the composite tooth profile with a certain amount of escape.

* * * * *